United States Patent
Wintergerst et al.

(10) Patent No.: US 8,667,471 B2
(45) Date of Patent: Mar. 4, 2014

(54) METHOD AND SYSTEM FOR CUSTOMIZING PROFILING SESSIONS

(75) Inventors: Michael Wintergerst, Rauenberg (DE); Ralf Schmelter, Wiesloch (DE); Arno Zeller, Mannheim (DE)

(73) Assignee: SAP AG, Walldorf (DE)

(*) Notice: Subject to any disclaimer, the term of this patent is extended or adjusted under 35 U.S.C. 154(b) by 1410 days.

(21) Appl. No.: 11/731,501

(22) Filed: Mar. 30, 2007

(65) Prior Publication Data
US 2008/0244537 A1    Oct. 2, 2008

(51) Int. Cl.
*G06F 9/44*    (2006.01)

(52) U.S. Cl.
USPC ........... 717/130; 717/124; 717/131; 717/128; 717/127

(58) Field of Classification Search
None
See application file for complete search history.

(56) References Cited

U.S. PATENT DOCUMENTS

| | | | |
|---|---|---|---|
| 5,408,650 A | 4/1995 | Arsenault | |
| 5,847,972 A | 12/1998 | Eick et al. | |
| 5,881,287 A | 3/1999 | Mast | |
| 5,918,053 A | 6/1999 | Graham | |
| 6,002,872 A | 12/1999 | Alexander, III et al. | |
| 6,055,492 A | 4/2000 | Alexander, III et al. | |
| 6,071,317 A | 6/2000 | Nagel | |
| 6,158,024 A | 12/2000 | Mandal | |
| 6,226,653 B1 | 5/2001 | Alpern et al. | |
| 6,308,319 B1 | 10/2001 | Bush et al. | |
| 6,317,869 B1 | 11/2001 | Adl-Tabatabai et al. | |
| 6,351,843 B1 | 2/2002 | Berkley et al. | |
| 6,363,521 B1 | 3/2002 | Yasue | |
| 6,393,439 B1 | 5/2002 | Houldsworth et al. | |
| 6,493,868 B1 | 12/2002 | DaSilva et al. | 717/105 |
| 6,539,501 B1 | 3/2003 | Edwards | |
| 6,658,652 B1 | 12/2003 | Alexander, III et al. | |
| 6,662,362 B1 | 12/2003 | Arora et al. | |
| 6,721,941 B1 | 4/2004 | Morshed et al. | |
| 6,751,789 B1 * | 6/2004 | Berry et al. | 717/130 |
| 6,792,460 B2 | 9/2004 | Oulu et al. | |
| 6,802,054 B2 | 10/2004 | Faraj | |
| 6,826,583 B1 | 11/2004 | Flood et al. | |
| 6,839,725 B2 | 1/2005 | Agesen et al. | |
| 6,857,120 B1 | 2/2005 | Arnold et al. | |
| 6,871,272 B2 | 3/2005 | Butterworth | |
| 6,892,378 B2 | 5/2005 | Curtis et al. | |
| 6,938,245 B1 | 8/2005 | Spertus et al. | |

(Continued)

OTHER PUBLICATIONS

Guéhéneuc et al. No Java without Caffeine: A Tool for Dynamic Analysis of Java Programs. [online] (May 16, 2002). IEEE, pp. 1-16. Retrieved From the Internet <http://bluecoat-01/?cfru=aHR0OcDovL2NpdGVzZWVyeC5pc3QucHN1LmVkdS92aWV3ZG9jL2Rvd25sb2FkP2RvaT0xMC4xLjEuMTguNTgzMiZyZXA9cmVwMSZ0eXBlPXBkZg==>.*

(Continued)

*Primary Examiner* — Insun Kang
(74) *Attorney, Agent, or Firm* — Blakely, Sokoloff, Taylor & Zafman LLP

(57) ABSTRACT

A system and method are provided to customize profiling sessions. In one embodiment, a profiling session at a first virtual machine is initiated, the profiling session including tracking a profiling event occurring at threads, each thread having associated semantical information corresponding to a plurality of profiling entities. A request from a second virtual machine is received specifying extracting profiling information when a profiling entity executes a thread where the profiling event occurs. The profiling information relating to the profiling entity is extracted as requested by the second virtual machine. The profiling information is communicated to the second virtual machine.

21 Claims, 10 Drawing Sheets

(56) References Cited

U.S. PATENT DOCUMENTS

| | | |
|---|---|---|
| 6,957,237 B1 | 10/2005 | Traversat et al. |
| 6,971,097 B1 | 11/2005 | Wallman |
| 7,007,270 B2 | 2/2006 | Martin et al. |
| 7,035,884 B2 | 4/2006 | Garthwaite |
| 7,058,928 B2 | 6/2006 | Wygodny et al. |
| 7,086,064 B1 | 8/2006 | Stevens |
| 7,107,578 B1 | 9/2006 | Alpern |
| 7,114,150 B2 | 9/2006 | Dimpsey et al. |
| 7,275,241 B2 | 9/2007 | Choi et al. |
| 7,293,260 B1 | 11/2007 | Dmitriev |
| 7,313,661 B1 | 12/2007 | Emitriev |
| 7,320,125 B2 | 1/2008 | Elliott et al. |
| 7,325,106 B1 | 1/2008 | Dmitriev et al. |
| 7,350,194 B1 | 3/2008 | Alpern |
| 7,428,560 B1 | 9/2008 | Detlefs et al. |
| 7,458,062 B2 | 11/2008 | Coulthard et al. |
| 7,464,373 B1 | 12/2008 | Yunt et al. |
| 7,493,601 B2 | 2/2009 | Gimness et al. |
| 7,676,801 B1 | 3/2010 | Garthwaite |
| 7,685,575 B1 | 3/2010 | Fareed |
| 7,765,528 B2 | 7/2010 | Findeisen et al. |
| 7,774,172 B1 | 8/2010 | Yunt et al. |
| 7,823,129 B2 | 10/2010 | Dimpsey et al. |
| 2001/0037336 A1 | 11/2001 | Sauntry et al. |
| 2002/0019716 A1 | 2/2002 | Agesen et al. |
| 2002/0066081 A1 | 5/2002 | Duesterwald et al. |
| 2002/0107879 A1 | 8/2002 | Arnold et al. |
| 2002/0120823 A1 | 8/2002 | Kolodner et al. |
| 2003/0056199 A1 | 3/2003 | Li et al. |
| 2003/0056200 A1 | 3/2003 | Li et al. |
| 2003/0088854 A1 | 5/2003 | Wygodny et al. |
| 2003/0233634 A1 | 12/2003 | Carrez et al. |
| 2004/0003119 A1 | 1/2004 | Munir et al. |
| 2004/0054984 A1 | 3/2004 | Chong et al. |
| 2004/0068560 A1 | 4/2004 | Oulu et al. |
| 2004/0073764 A1 | 4/2004 | Andreasson |
| 2004/0078381 A1 | 4/2004 | Blandy et al. |
| 2004/0111447 A1 | 6/2004 | Garthwaite |
| 2004/0111451 A1 | 6/2004 | Garthwaite |
| 2004/0133895 A1 | 7/2004 | Dahlstedt et al. |
| 2004/0158589 A1 | 8/2004 | Liang et al. |
| 2004/0158819 A1 | 8/2004 | Cuomo et al. |
| 2004/0177243 A1 | 9/2004 | Worley |
| 2004/0205409 A1 | 10/2004 | Wu et al. |
| 2004/0210877 A1 | 10/2004 | Sluiman et al. |
| 2004/0230956 A1 | 11/2004 | Cirne et al. |
| 2005/0076265 A1 | 4/2005 | Hsu et al. |
| 2005/0081190 A1 | 4/2005 | Betancourt et al. |
| 2005/0091646 A1 | 4/2005 | Chilimbi et al. |
| 2005/0102673 A1 | 5/2005 | DeWitt et al. |
| 2005/0138623 A1 | 6/2005 | Fresko |
| 2005/0172299 A1 | 8/2005 | Zhao et al. |
| 2005/0198088 A1 | 9/2005 | Subramoney et al. |
| 2005/0240641 A1 | 10/2005 | Kimura et al. |
| 2005/0261879 A1 | 11/2005 | Shrivastava et al. |
| 2005/0273757 A1 | 12/2005 | Anderson |
| 2006/0059453 A1 | 3/2006 | Kuck et al. |
| 2006/0064687 A1* | 3/2006 | Dostert ............................ 718/1 |
| 2006/0080639 A1 | 4/2006 | Bustelo et al. |
| 2006/0129993 A1 | 6/2006 | Belisario et al. |
| 2006/0136530 A1 | 6/2006 | Rossmann |
| 2006/0143596 A1 | 6/2006 | Miyashita et al. |
| 2006/0190930 A1 | 8/2006 | Hecht et al. |
| 2006/0248131 A1 | 11/2006 | Marwinski et al. |
| 2006/0248177 A1 | 11/2006 | Dostert et al. |
| 2006/0277528 A1 | 12/2006 | Chen et al. |
| 2007/0006168 A1 | 1/2007 | Dimpsey et al. |
| 2007/0016893 A1 | 1/2007 | Branda et al. |
| 2007/0027942 A1 | 2/2007 | Trotter |
| 2007/0074170 A1 | 3/2007 | Rossmann |
| 2007/0079307 A1 | 4/2007 | Dhawan et al. |
| 2007/0169003 A1 | 7/2007 | Branda et al. |
| 2008/0109796 A1* | 5/2008 | Kosche ........................ 717/158 |
| 2008/0127107 A1 | 5/2008 | Kosche et al. |
| 2008/0209404 A1 | 8/2008 | Brady |
| 2008/0243968 A1 | 10/2008 | Schmelter et al. |
| 2008/0243969 A1 | 10/2008 | Wintergerst et al. |
| 2008/0243970 A1 | 10/2008 | Schmelter et al. |
| 2008/0244546 A1 | 10/2008 | Schmelter et al. |
| 2008/0244547 A1 | 10/2008 | Wintergerst et al. |

OTHER PUBLICATIONS

Non-Final Office Action for U.S. Appl. No. 12/638,500 Mailed Jul. 13, 2010, 14 Pages.

Final Office Action for U.S. Appl. No. 11/731,267 Mailed Jul. 15, 2010, 13 Pages.

Notice of Allowance for U.S. Appl. No. 11/731,267, Mailed Nov. 4, 2010, 17 pages.

Final Office Action for U.S. Appl. No. 12/638,500, Mailed Nov. 3, 2010, 17 pages, 17 Pages.

Non-Final Office Action for U.S. Appl. No. 11/731,397, Mailed Nov. 8, 2010, 14 pages.

Non-Final Office Action for U.S. Appl. No. 11/731,684, Mailed Nov. 26, 2010 26 pages.

Non-Final Office Action for U.S. Appl. No. 11/731,360, Mailed Feb. 1, 2011, 24 pages.

Notice of Allowance for U.S. Appl. No. 12/638,500, Mailed Feb. 14, 2011, 9 pages.

Chilimbi, Trishul M., et al., "Low-Overhead Mamory Leak Detection Using Adaptive Statistical Profiling", *Matthias Hauswirth*, Oct. 2003. *ACM. ASPLOS* 2004., (Oct. 2004).

Hertz, Matthew, et al., "Error-free garbage collection traces: how to cheat and not get caught", Stephen M. Blackburn, J Eliot B Moss, Kathryn S. McKinley, Darko Stefanovi; vol. 30, Issue 1 (Jun. 2002) *ACM Sigmetrics Performance Evaluation Review archive*, (Jun. 2002), 12 pages.

Vaught, Andy "Take Command: gprof, bprof and Time Profilers", May 1998, *Linux Journal*. Issue 49, (May 1998), 6 pages.

Non-Final Office Action for U.S. Appl. No. 11/731,267 dated May 28, 2009; 15 pages.

Non-Final Office Action for U.S. Appl. No. 11/731,499 Mailed Jul. 29, 2009; 12 pages.

Final Office Action for U.S. Appl. No. 11/731,267 Mailed Oct. 14, 2009, 11 Pages.

Non-Final Office Action for U.S. Appl. No. 11/731,267 Mailed Mar. 1, 2010, 14 Pages.

Gupta, Satich C., et al., "Java Memory Leaks—Catch me if you can", Aug. 16, 2005, *IBM*.

Sun Microsystems, "Simplified Guide to the Java 2 Platform, Enterprise Edition", 1999, *Sun Microsystems*.

Non Final Office Action for U.S. Appl. No. 11/731,550 Mailed Feb. 17, 2011, 28 pages.

Final Office Action for U.S. Appl. No. 11/731,360, Mailed Jun. 7, 2011, 20 pages.

Final Office Action for U.S. Appl. No. 11/731,550, Mailed Jul. 8, 2011, 27 pages.

Final Office Action for U.S. Appl. No. 11/731,397, Mailed Apr. 13, 2011, 13 pages.

Viswanathan, et al., "Java Virtual Machine Profiler Interface", [online] (Jan. 2000) *IBM, IBM Systems Journal*, vol. 39, No. 1, pp. 82-95, Retrieved From the Internet.

Final Office Action for U.S. Appl. No. 11/731,684, Mailed Apr. 26, 2011, 12 pages.

Non-Final Office Action for U.S. Appl. No. 11/731,684, Mailed Nov. 26, 2010, 26 pages.

Non-Final Office Action for U.S. Appl. No. 11/731,501, Mailed Jul. 19, 2011, 18 pages.

Final Office Action for U.S. Appl. No. 11/731,501, Mailed Dec. 28, 2011.

Notice of Allowance for U.S. Appl. No. 11/731,360, Mailed Aug. 15, 2012.

Notice of Allowance for U.S. Appl. No. 11/731,550, Mailed Sep. 12, 2012.

(56) References Cited

OTHER PUBLICATIONS

"The Java Virtual Machine Profiling Interface", *Java Developers Journel*, Apr. 2004, <http:www2.sys-con.com/itsg/virtualcd/java/archives/0802/aultman/index.html>, pp. 1-6.

Arnold, Mathews, et al., "Collecting and Exploiting High-Accuracy Call Graph Profiles in Virtual Machines" ,*IEEE*, 2005.

Berndl, Marc, et al., "Dynamic Profiling and Trace Cache Generation", *IEEE*, 2003, <http://ieeexplore.ieee.org/stamp/stamp.jsp?tp=arnumber1191552>, pp. 1-10.

Bockisch, Chistoph, et al. "Efficient Control Flow Quantification", *ACM*, 2006, http://delivery.acm.org/10.1145/1170000/1167484/p125-bockisch.pdf, pp. 1-13.

Liu, Zhen, et al, "Dynamic Learning of Automata from the Call Stack Log for Anomaly Detection", *IEEE*, 2005, http://ieeexplore.ieee.org/stamp/stamp.jsp?tp=&arnumber=1428558, pp. 1-6.

Shende, Sameer, et al., "Dynamic Performance Callstack Sampling: Merging TAU and DAQV", University of Orefon, 2004, http://www.google.com/url?sa=t&rct=j&q=&esrc=s&frm=1&source=web&cd=1&ved=0CHoQFjAA&url=, pp. 1-10.

\* cited by examiner

METHOD AND SYSTEM FOR CUSTOMIZING PROFILING SESSIONS

FIELD

Embodiments of the invention relate generally to the field of data processing systems. More particularly, the embodiments of the invention relate to customizing profiling sessions.

BACKGROUND

A memory on any computing system is a limited resource. No matter how fast computing systems become, they always depend upon a finite amount of memory in which to run their software applications. As a result, software developers should consider this resource when writing and developing software applications.

The JAVA® programming language differs from many traditional programming languages (e.g., C, C++) by the way in which memory is allocated and deallocated. In languages like C and C++, memory is explicitly allocated and deallocated by the application programmer/developer. This can greatly increase the time spent by programmers in tracking down coding defects in regards to deallocating memory. The JAVA programming language presents several features that appeal to developers of large-scale distributed systems, such as "write once, run anywhere" portability, portable support for multithreaded programming, support for distributed programming, including remote method invocation, garbage collection, and an appealing object model have encouraged JAVA use for systems with a size and complexity far beyond small applets. However, the developers of these applications often encounter problems, such as memory leaks, performance and scalability problems, synchronization problems, and programming errors.

JAVA runtime environments (e.g., JAVA virtual machine) provide a built-in mechanism for allocating and deallocating memory. In JAVA, memory is allocated to objects. The JAVA virtual machine ("VM" or "JVM") automatically handles the amount and allocation of memory upon an object's creation. The JAVA runtime environment employs a garbage collector ("GC") to reclaim the memory allocated to an object that is no longer needed. Once the GC determines that the object is no longer accessible (e.g., when there is no longer any references to it stored in any variables, the fields of objects, or the elements of any arrays, etc.), it reclaims the allocated memory. When objects in a JAVA application are no longer referenced, the heap space the object occupied is to be recycled so that the space becomes available for subsequently-created objects.

Although having garbage collection improves productivity, it is not entirely immune from a class of bugs, called "memory leaks." A memory leak can occur when a program (or in the case of JAVA, the VM) allocates memory to an object but never (or only partially) deallocates the memory when the object is no longer needed. As a result, a continually increasing block of memory may be allocated to the object, eventually resulting in an "Out Of Memory Error" (OOME). In other words, a memory leak occurs when memory is allocated, but it is never (or only partially) reclaimed. Memory leaks can also occur when a data structure (e.g., hashtable) is used to associated one object with another and even when neither object is required any longer, the association with the data structure remains, preventing the objects from being reclaims until the data structure is reclaimed. Stated differently, when a lifetime of the data structure is longer than that of the objects associated with it, memory leaks are caused.

Memory leaks are of particular concern on JAVA-based systems (e.g., JAVA 2 Platform Enterprise Edition (J2EE) platforms) which are to run twenty-four hours a day, seven days a week. In this case, memory leaks, even seemingly insignificant ones, can become a major problem. Even the smallest memory leak in code that runs 24/7 may eventually cause an OOME, which can bring down the VM and its applications or even all VMs running on a particular application server instance. This can cause critical performance problems.

It is generally preferred to profile memory use and debug memory leaks in an application code in the early stages of development to provide an early detection of memory problems long before the production stage. Although garbage collection makes code much safer, because having the developer to explicitly delete objects from memory is prone to human error, garbage collection is not a panacea. For example, if the developer does not manage the references to the JAVA carefully, it can result in a memory leak problem, such as a reference to an object is stored within an instance or class field, this reference may exist throughout the life of the application and, unless desired, is regarded a memory leak.

Within a distributed application server environment having thousand of concurrent users, performance and scalability problems are typical. The causes of problems are various, such as synchronization problems, extensive access to shared resources (e.g., database systems), bad configuration settings, etc. To provide consistency within such a system, locks with various validity scopes (e.g., VM-local, application-server-wide, and system-wide) are used; however, deadlock situations and synchronization problems exist.

Several performance monitoring, profiling, and debugging tools are used to examine software applications to determine resource consumption within the JAVA runtime environment (JRE). For example, a profiling tool may identify the most frequently executed methods and objects created in an application. However, such tools are very limited in detecting and exposing system inefficiencies and problems (e.g., memory leaks), while consuming great amounts of system resources by requiring overhead tasks, such as starting and restarting of VMs in special modes. Further, such tools are also limited in providing necessary information about system problems and the limited information that these tools may provide is not useful for applications comprising several thousand objects. This leaves developers with often insurmountable amounts of code to manually evaluate to track down the problem objects/variables, such as the specific class, method calls, etc. For example, conventional profiling tools, like Optimizeit and JProbe, when used, require restarting of VMs and servers, which results in loss of production and system resources, particularly when restarting a productive system. Moreover, the starting of a server and its VMs further adds to the system overhead by increasing memory consumption, which also harms the normal work of the server and server software. The restarting of the server adds overhead in regards to the Central Processing Unit (CPU), as the server would have to start up from scratch.

Regarding profiling allocations, all conventional commercial and non-commercial profiling techniques affect all users and applications running in a particular JAVA VM if, for example, when a specific CPU intensive profiling trace is started, the complete VM slows down and all users running in that VM get a negative impact on response times. This is particularly unacceptable when dealing with a large-scale mission critical applications server environment. Moreover, no additional knowledge or information is provided about any of the users or sessions or software components that are associated with the actual allocation that has taken place and thus, all of the users and applications running in a VM are negatively impacted.

FIG. 1 illustrates a conventional profiling tool. Client 102 is in communication with server 108. Client 102 includes a VM 102. Server 108 includes a VM 112, which includes JAVA Virtual Machine Profiling Interface (JVMPI)-based interface 116 and implementation 114. Server 108 further includes a native/default profiling agent (having an agent library) 110 which is plugged into the VM 112 at startup. Since JVMPI is a native/default-interface, the agent 110 is also written in native code. An agent 110 refers to a software entity, which is used to gather profiling information native VM interfaces (e.g., JVMPI). JVMPI-based implementation 114 suffers from high memory footprints and, like conventional tools JProbe and Wily Introscope, requires a VM restart. However, conventional profiling tools (e.g., also those using JAVA Virtual Machine Tool Interface (JVMTI)) cannot be used in productive systems without disturbing user sessions. Further, they cannot be used in large application server environments as they cause high memory consumption. Referring back to FIG. 1, for example, to start profiling traces, the VM 112 is to be restarted in special way, such as by having the agent 110 loaded at VM-startup, which can cause negative impact on performance and memory consumption. There are merely some of the limitations of conventional profiling solutions. Similarly, conventional monitoring tools and debugging tools (e.g., using JAVA Virtual Machine Debugging Interface (JVMDI)) also suffer from these and additional limitations.

SUMMARY

A system and method are provided to customize profiling sessions. In one embodiment, a profiling session at a first virtual machine is initiated, the profiling session including tracking a profiling event occurring at threads, each thread having associated semantical information corresponding to a plurality of profiling entities. A request from a second virtual machine is received specifying extracting profiling information when a profiling entity executes a thread where the profiling event occurs. The profiling information relating to the profiling entity is extracted as requested by the second virtual machine. The profiling information is communicated to the second virtual machine.

The above attributes may be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

JAVA applications can vary in both size and complexity. In addition, certain large JAVA application (e.g., ~10,000 classes and ~1,000,000 methods with ~100,000,000 method calls) may run 24/7 ("long living" applications). Within a long living application, major problems (e.g., memory leaks) are expected to occur in terms of both stability and performance. For example, a single long living object that increases in size by 1 byte between each GC cycle will eventually cause the application and VM to crash due to an OOME. Although such a crash may take a long time (e.g., 1 bytes per GC cycle*millions of free bytes of memory), it will inevitably occur. Furthermore, when dealing with such long applications and productive systems, mere use of commercial and non-commercial conventional profiling tools and debugging tools having JVMPI and JVMTI profiling interfaces and JVMDI debugging interface, respectively, are not suitable and cannot provide the necessary profiling, debugging, and monitoring information. Even when dealing with suitable systems, such conventional tools cause high memory footprints and are not effective without having to restart the VM and are known to disturb user sessions inherent to the VM.

Figure 1:
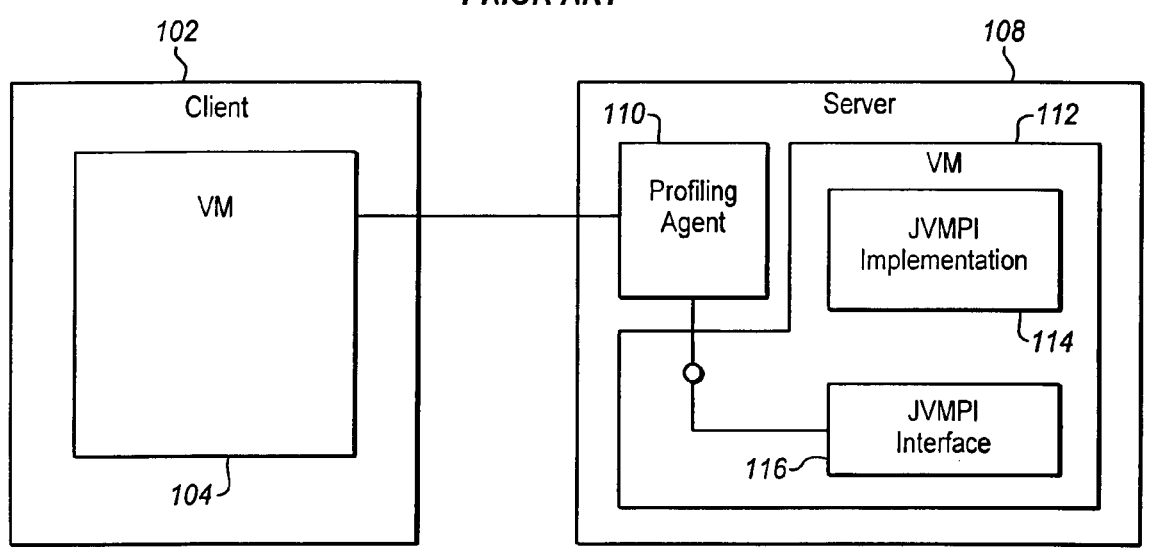
FIG. 1 illustrates a conventional profiling tool.

In one embodiment, a vendor-specific proprietary interface and implementation are provided, as described throughout this document (e.g., see FIG. 1). This implementation can be made an integral part of a VM (e.g., JVM, SAP JVM) and allow for on-demand examining of system problems, including in productive systems, without restarting the underlying VM. These system problems can range anywhere from memory leaks to performance, scalability and synchronization problems. In one embodiment, "on-demand" refers to examining (e.g., profiling, tracing, debugging, and/or monitoring) system problems in runtime, such as without the need for restarting the underlying VM.

Figure 2:
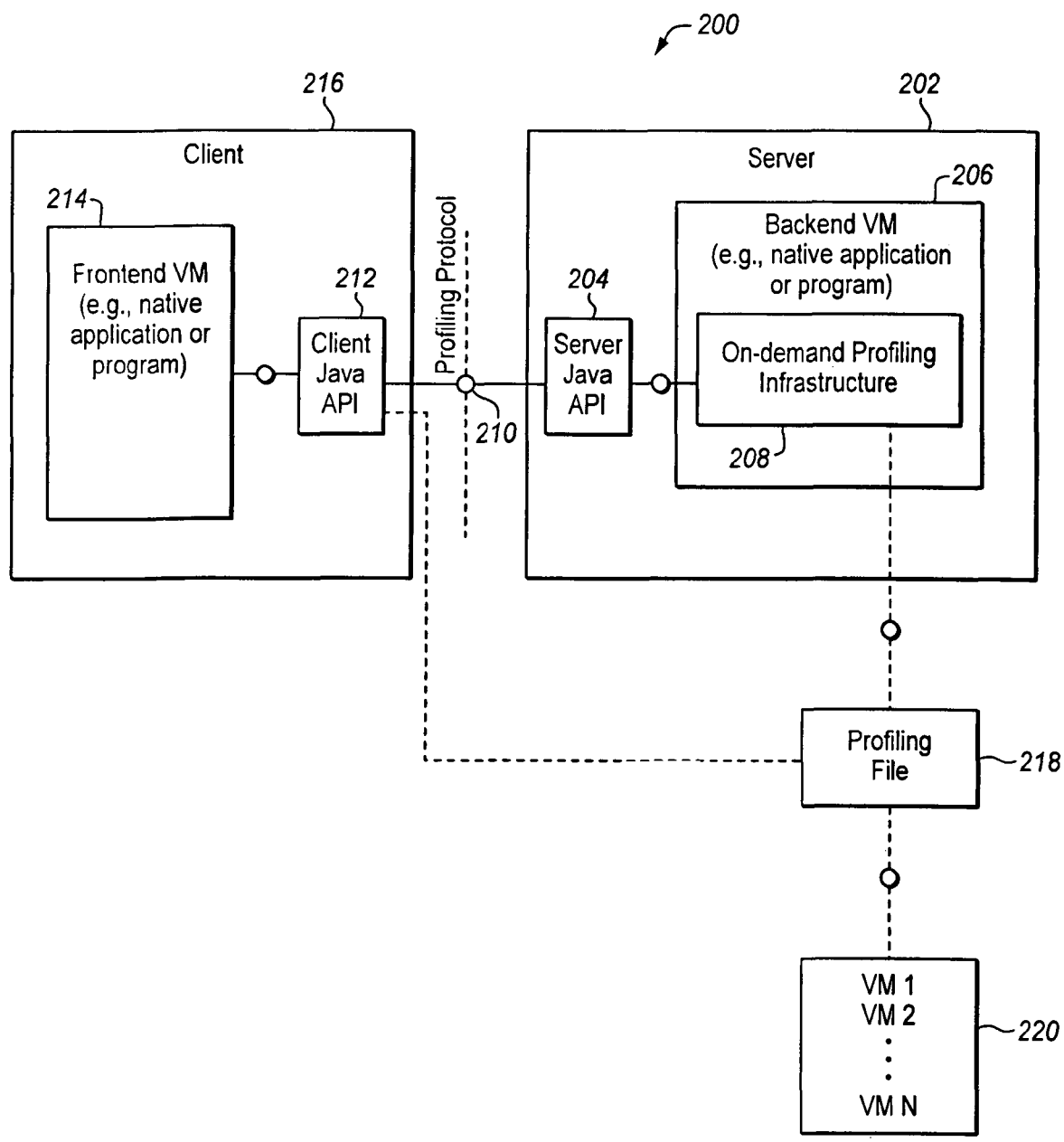
FIG. 2 illustrates an embodiment of a server having an embodiment of an on-demand profiling infrastructure.

FIG. 2 illustrates an embodiment of a server 202 having an embodiment of an on-demand profiling infrastructure 208. Sever 202 comprises a backend VM 206 (e.g., JVM, SAP JVM) having an embodiment of an on-demand profiling framework or infrastructure (profiling infrastructure) 208. Profiling infrastructure 208 is shown in communication with a server JAVA application programming interface (API) 204. In one embodiment, profiling infrastructure 208 is implemented as an intrinsic and direct part of the underlying VM 206 and is embedded within the backend VM 206, rather than relying on native profiling interfaces, such as JVMTI and JVMPI, and agent, for implementation. Since the profiling infrastructure 208 is an intrinsic part of the backend VM 206, no additional memory overhead is needed. JAVA API 204 allows for starting and stopping of the profiling backend VM 206. In one embodiment, backend VM 206 (e.g., JAVA VM) resides at server 202 (e.g., J2EE server).

In one embodiment, profiling is performed using profiling infrastructure 208 that resides at backend VM 206 that is being profiled. Profiling infrastructure 208 includes a number of components (as described in FIG. 3) to perform trace profiling. In one embodiment, using profiling infrastructure 208, no default profiling agent or default implementations and instances (e.g., JVMPI, JVMTI) are needed or employed. Without having the default agent employed, a direct communication is established between backend VM 206 and frontend VM 214 via server JAVA API 204 and client JAVA API 212 and profiling protocol 210. Any number of VMs may be used as backend or frontend VMs. Furthermore, when performing profiling trace in an offline profiling mode, an external profiling file 218 is used to store profiling trace data. Starting and stopping of profiling trace may be performed in a number of ways, such as using a Graphical User Interface (GUI)-based monitoring tool 220. The profiling data is written using various components of profiling infrastructure 208 and displayed to the user using any number of display devices. These display devices may include GUI-based display devices. In one embodiment, using profiling infrastructure 208, on-demand profiling is performed which refers to performing the profiling without restarting the underlying VM 206. Stated differently, the profiling is performed in runtime without any interruptions or restarting of the underlying VM 206.

It is to be noted that the VMs 206, 214 may not be VMs and instead be any program or application (e.g., a native application or program) that is compatible with the components of and related to the profiling infrastructure 208. For example, the frontend VM 214 is illustrated here merely as an example for brevity and clarity. It is, however, contemplated that a frontend VM 214 or any VM for that matter is not necessary for embodiments of the present invention. For example, in one embodiment, instead of employing a VM 214, any program or application that is compatible with the mechanisms and components described herein is acceptable and functional and can be employed and implemented. Stated differently, for example, any program that can read and speak the described components (e.g., components of profiling infrastructure 208), protocols (e.g., socket communication protocol), APIs (e.g., server- and client-side APIs 204, 212), parameters, profiling files 218, etc., is compatible and can be used instead of a VM, such as the frontend VM 214. This is applicable throughout this document wherever there is mention of a VM 206, 214.

Profiling infrastructure 208 can be used for starting profiling traces for certain users or applications, such as using profiling annotations. Profiling annotations refer to a concept of tagging threads with certain semantic information from an application server environment. Here, JAVA API 204 is provided which allows for annotating a JAVA thread with one or more of the following information: user name, application name, request identifier, and session identifier. If profiling traces are started, a thread filter for such information is provided and thus, a profiling trace can be started only a certain user or application. A JAVA API is also provided on the client-side, such as client JAVA API 212, that communication with server JAVA API 204 via a profiling protocol 210. Client 216 includes frontend VM 214, which includes any arbitrary VM that represents a native application that speaks (e.g., in case of online profiling) the profiling protocol 210 and/or knows (e.g., in case of offline profiling) the profiling file format of profiling file 218. Backend VM 206 is the one that is being profiled.

The illustrated mechanism 200 provides both an online mechanism for (interactive) profiling and an offline mechanism for (non-interactive) profiling. When starting profiling the backend VM 206, any profiling parameters including the desired mode, e.g., an online or offline mode, are specified. If started in the online mode, the profiling backend VM 206 opens a port and waits for a connection. The profiling frontend VM 214 attach to this connection via the profiling protocol 210 and JAVA APIs 204, 212. The starting, running, and stopping of profiling and tracing is then performed. In one embodiment, online profiling is performed via internal components, such as JAVA APIs 204, 212, or external components, such as a monitoring tool (e.g., JAVA VM monitor) 220. Online profiling may also be performed using a command line, such as java—agentlib:jdwp,transport=dt_socket, address=8000,suspend=n or bin\java—monjdwp: transport=dt_socket,address=8000, server=y. For the offline mode, profiling files 218 are used to store profiling data and a special interface is provided to couple the backend VM 206 with the frontend VM 214 via client JAVA API 212 to allow for starting and stopping of traces. In some cases, server JAVA API 204 can also be used to perform offline profiling. Offline profiling may also be performed using monitoring tool 220 and/or using a command line, such as java—XX:+Profiling— XX:+ProfilingAlloationTrace.

When the profiling mechanism 200 is started in the offline or non-interactive mode, the profiling information is stored in an external medium 218 (e.g., file system) and can be analyzed after the profiling run. This way, the profiling information may then be used for port-mortem analysis; however, traces can still be started and stopped in an interactive manner. In contrast, the online or interactive mode allows for analyzing the profiling information online. For example, if a class statistic trace has been enabled and a garbage collection happens, the profiling information can be directly accessible through a stream-based interface.

Furthermore, to have no performance degradation in case of running in a non-profiling mode (e.g., when no profiling is being performed), VM 206 may maintain a global flag indicating whether profiling is enabled or not. The flag may be requested each time any profiling data is written. For example, a profiling trace for garbage collection events may be implemented in the following way: when a garbage collection is performed, the global profiling flag is checked. If profiling is enabled, the flag is checked to indicate whether garbage collection events are to be profiled. This can also be done via some VM global flags. If the garbage collection trace is enabled, the backend VM 206 may be called to collect the desired data.

Figure 3:
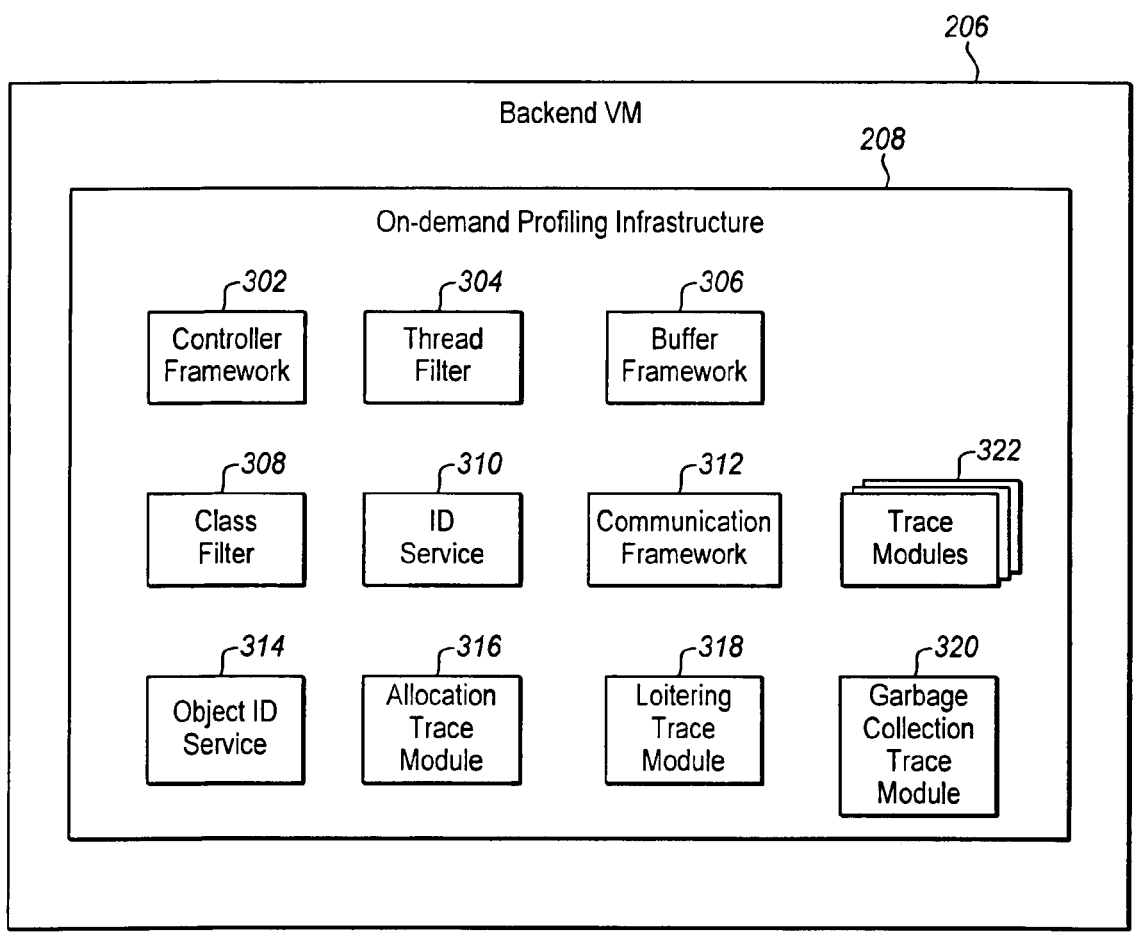
FIG. 3 illustrates an embodiment of a backend VM having an embodiment of an on-demand profiling infrastructure.

FIG. 3 illustrates an embodiment of a backend VM 206 having an embodiment of an on-demand profiling infrastructure 208. In one embodiment, profiling infrastructure 208 contains controller framework 302, thread filter 304, buffer framework 306, class filter 308, identification service 310, communication framework 312, object identification service 314, allocation trace module 316, loitering trace module 318, garbage collection trace module 320, and other trace modules 322 to perform other traces.

In one embodiment, profiling controller framework 302 is used for starting and stopping profiling runs and traces. Controller framework 302 allows the user to specify profiling options or settings that the user would want to enable. These profiling settings to be applied are divided into distinct areas, such as functional profiling settings and filter settings. The functional profiling settings determine the area to be profiled (e.g., allocation trace, reference trace, etc.), while the filter settings define the validity scope (e.g., user, session, thread, VM, etc.) of the functional profiling settings. For example, an allocation trace can be started for a specified user. JAVA API and graphical user interface (GUI) are provided in communication with profiling controller framework 302. GUI is used to enable the user to directly specify the desired profiling settings without any system-guidance. Additionally, a wizard-similar interface is provided. GUI also allows for an expert mode and for a wizard-guided mode. Controller framework 302 may include a profiling evaluation module for analyzing a performed profiling run. For example, the JAVA API can be used for getting the complete low-level profiling information gathered within a corresponding profiling run as well as for getting condensed, problem-oriented profiling information. The condensed profiling information may be used to directly pinpoint various problematic areas. For example, if the user has performed performance analysis using a time-based sampling approach, the JAVA API may enable a client to directly receive information about the time-consuming methods. The user may view this information via GUI at a display device at the client.

Controller framework 302 is used for starting and stopping profiling runs and traces, which includes starting and stopping various profiling options (further described later). For each profiling run the user is free to determine the set of traces to be started. For example, the user may start an allocation trace using the allocation trace module 316 together with a class statistic trace. A user-defined name may be assigned to each non-interactive profiling run and used later on to evaluate the gathered profiling information. Considering interactive profiling runs, the user is able to evaluate the profiling information online and therefore, the profiling information may be available through a stream-based interface.

Furthermore, controller framework 302 may be independent of the surrounding application server environment. Stated differently, controller framework 302 refers to the underlying VM 206 currently executing a profiling request (e.g., starting an allocation trace). The corresponding application server infrastructure may be responsible for starting and stopping the desired trace on other VMs. For example, if an allocation trace is started for a certain user session at VM 208, the application server infrastructure accounts for starting the allocation trace in the VMs executing requests for the user session. Controller framework 302 enables the application server infrastructure to specify thread filters 304. A thread filter 304 may contain the following information: client, user, session identifier, request identifier, application name, and component name. On the one hand, controller framework 302 may provide a facility to tag these pieces of information to a thread. On the other hand, if a certain profiling run is to be started, a thread filter 304 is provided. Hence, for example, a trace may be stared only for a certain user. Accordingly, the application server is responsible for setting the current thread state (e.g., client, user, session identifier, etc.). In one embodiment, an application server includes a J2EE server.

In one embodiment, the profiling options include functions/cases, such as memory debugging (e.g., memory leak detection), performance analysis, synchronization monitoring, and application debugging (e.g., detecting called methods). These profiling functions further include a number of sub-functions, such as heap dump, coupling of debugging and profiling infrastructure, time-based sampling, memory-based sampling, method statistic, allocation trace, silent allocation trace, allocation statistic trace, loitering trace, garbage collection trace, garbage collection statistic, class statistic trace, permanent generation statistic trace, local garbage collection trace, shared garbage collection statistic, other traces, such as reference trace, object death trace, object movement trace, shared closure trace, global reference trace, method trace, time method trace, input/output (I/O) trace, monitor trace, shared lock trace, method count trace, execution line trace, scheduler trace, and exception trace.

Solving a memory leak problem may include a couple of processes, such as identifying the JAVA classes or objects caused the memory leak, and determining where in the infrastructure or application code the leak occurred. Many of the sub functions can be used to solve memory leak problems. Class statistic trace functionality is provided to help identify the JAVA classes that cause memory leaks. Class statistic trace includes getting an overview of all living classes within particular VM, including class name, class loader description, the number of object instances, and the accumulated net and gross size of all object instances. The information may be traced after each full local garbage collection. Reference trace includes detecting the objects holding references to leaking objects. It also provides the complete reference chain to a specific object instance. This information may also be available after one full local garbage collection.

If the class statistic trace reveals that specific objects are created over and over again, using the allocation trace module 316, the allocation trace may be enabled to check for the exact allocation place. Using the allocation trace module 316, the allocation trace enables the user to specify a class filter 308. Silent allocation trace is a derivate of allocation trace. When an allocation trace is started, each object, which is allocated and adheres to a user-defined class filter 308, is assigned to an object identifier. Although the allocation trace enables the user to get informed about object allocations, the user may not get the information when the corresponding object dies. In that case, object death trace allows the user to check for those objects are garbage collected and no longer alive. Object movement trace makes allows the checking of why certain objects are kept alive, while the allocation trace allows for getting information when certain objects are created.

Shared closure trace provides for getting object information each time shared closures are created, deleted, copied or mapped. Global references may be used across multiple invocations of a JAVA Native Interface (JNI) method and also across multiple threads. A global reference remains valid until it is freed by the programmer and ensures that the referenced object is not garbage collected. For relatively complex scenarios, a dump of the current JAVA heap is performed. The heap dump functional-lows for getting a dump of the current, overall object state.

In some cases, memory leaks occur due to the fact that a failed clean-up operation. For example, considering a cache based on shared closures, at regular intervals, the cache might be cleared. If the clean-up operation were interrupted at the end of the operation (e.g., due to a VM abort exception), most cache entries would probably be deleted; however, some entries might still exist. Thus, a memory leak may be resulted if the cache were not able to remove any of the existing entries. The detection of this kind of memory leak could be difficult, since most object instances of the corresponding class are removed and merely a few exist. Thus, class statistic trace may not be the right choice to detect such a memory leak. One characteristic of this problem is that the memory leak is caused by objects which may not be used any longer. The loitering trace performed via loitering trace module 318 facilitates the detection of objects which are not used for a long time.

Various performance problems may be caused by any number of reasons, such as choosing the wrong algorithm for a problem, repeatedly recalculating the same result, excessive allocating of temporary objects, too many I/O operations or transferring too much memory, etc. Profiling helps improving the performance by determining what is it that is to be optimized. Profiling identifies parts of the overall system for which optimization can have an impact on the overall performance. Optimizing a function which only amounts to a miniscule fraction of the overall runtime may not have noticeable benefits. Profiling also determines how the optimization is to be done. Checking for optimization options of those parts that are identified during the first process. Time-based sampling is used to get an overview of methods, which consume the most CPU resources of the application. Time-based sampling works by dumping a stack trace of the currently active thread at regular intervals. Memory-based sampling works analogously to the time-base sampling; however instead of dumping a stack trace in time intervals (At), stack trace is sampled after an amount of memory (ΔM) is allocated on the JAVA heap. This way, those methods that allocate the largest number of bytes on the JAVA heap are identified.

When time-based sampling shows that a method uses a large amount of time, the reason for this resource consumption might be that a call of the method is expensive or the method is called very often. To find out how many times a particular method was called, method statistic trace may be used. Together with time-based sampling, method statistic trace may also allow for calculating the average runtime of a specific method (e.g., the "cumulative time" divided by the method count). Method trace is used to get more detailed information than method statistic. Time method trace can be used to provide very detailed trace information. Time method trace provides for detecting method calls that (for any number of reasons) take a particularly long time. To see, if garbage collection is properly configured or if a particular problem related to garbage collection exists, local GC statistic is used, which includes dumping a statistical entry for each local garbage collection (partial and full) for each garbage collection run. Shared GC statistic is emitted when a local GC detects that a shared GC has happened and has not been dumped yet. The shared GC statistic contains the number and size of the collected shared classes, shared interned strings, and shared classes.

Another source of performance problems is related to I/O. These I/O-related problems include a network connection being operated at its bandwidth maximum, the latency being too high, an external system being overloaded, etc. To check for an I/O problem, I/O trace allows for tracing the timing of each I/O operation. I/O trace can be used in analysis to check for operations, where huge amounts of data were transmitted, the I/O operation took an extraordinary amount of time, or a huge amount of small I/O operations was performed.

JAVA has an explicit support for multithreading and concurrency at the language level. Although these welcome features, the typical problems with multithreading and concurrency are deadlocks, race conditions, thread starvation, and scalability problems. Synchronization monitoring is provided to detect such problems. For example, synchronization monitoring includes monitor trace that identifies deadlock or scalability problems and gathers information about locks used inside a VM. To find synchronization problems, a thread trying to acquire a lock is identified and once it is identified, the lock is freed by the thread. Shared lock trace is used to identify deadlocks between VMs and scalability problems of a server instance. Shared lock trace provides information about different kinds of shared lock activities, like entering and leaving. Further, for such problems above, scheduler trace is used to know why a thread was scheduled and why it gave up control of the CPU, and for how long the entire VM was waiting on external I/O or just sleeping.

In one embodiment, application debugging is used to provide those the debugging functionalities that are not supported by conventional debugging instances and protocols, such as JVMDI, JAVA Debug Wire Protocol (JDWP), etc. For example, application debugging covers functionalities, such as call coverage and line coverage. Regarding call coverage, method count trace may deliver a number of calls to a method. Regarding line coverage, execution line trace may deliver information about code lines that were executed. Method call trace is used to find all methods that are called. When the method call trace is enabled, the VM 206 counts method calls and when the method call trace is disabled, the VM 206 dumps the collected information, such as name and signature of a method and the number of times it was called. Execution line trace may be used to find out the lines of code that are not executed. When the execution line trace is triggered, it enables the VM to write out information about the method and code line each time a byte code is interpreted and/or the line number changes. Such information can help the developer find out the lines of code that are not covered particular test cases.

Method trace may be employed to trace or profile the debugging process of an application. For example, the method trace is used to find out what has happened before the program reaches a certain point. Such information may be used to trace back the program flow and find out in which way the program reached that point of code. Exception trace is another functionality that may be employed to trace or profile the debugging process of an application. This information can be used to trace back the reasons for exceptions that followed up and for different execution branches.

In one embodiment, a dedicated JAVA API and a GUI is provided to allow for starting and stopping of various functionalities and uses (e.g., allocation trace, loitering trace, GC trace, and other traces) and for getting the corresponding profiling and tracing results. To determine and analyze the profiling and tracing results, an expert mode and/or a guided mode are provided. For example, a guided mode may directly pinpoint any problem areas.

Profiling infrastructure 208 is compatible with multiple clients. For example, depending on the surrounding application server infrastructure and whether any clients are handled in a special way, the profiling infrastructure 208 may perform in compliance with several clients, simultaneously, and remain multiple client-compliant. Profiling infrastructure 208 also allows for restricting profiling runs to certain clients, while the surrounding application server environment may assure that the current client information is assigned to the respective thread. Furthermore, profiling infrastructure 208 may be started on-demand, which includes performing profiling infrastructure functionalities (e.g., profiling, tracing, etc.) without restarting the entire application server or even the underlying VM 206. If no profiling option is enabled by a certain user, there is no impact on the response time caused by the profiling infrastructure 208. However, if profiling is enabled, it may depend on the started profiling options and filter settings about how the overall system performance is influenced. For example, if a method trace is started on an application server without any filter settings (e.g., user, classes, etc.), the performance may decrease to an extent. Therefore, the profiling infrastructure 208 as well as the application server infrastructure must provide options to restrict profiling runs. This way, profiling may be enabled for a particular user or session, while users and sessions remain unaffected. In addition, profiling infrastructure 208 provides reasonable and necessary filter settings for various profiling traces.

Class filters 308 are implemented to allow for limiting profiling trace out-puts by limiting the process of profiling to, for example, specific traces. For example, if a developer seeks to profile only JAVA object allocations which refer to java.lang.HashMap instances, then, using class filters 308, a profiling allocation trace with a class filter applying exclusively to java.lang.HashMap instances is started. Thread filters 304 relate to profiling annotations (e.g., specifying annotations), such as when an allocation trace exists. Thread filters 304 may also be used by the user to specify when and/or where a trace is to be triggered and/or used. Buffer framework 306 is used to compress and decompress any type of data or information that is being communicated, stored, etc. Communication framework 312 is used to facilitate communication of any data or information between and within various components, elements, modules, systems, servers, VM, etc. Communication framework 312 is also used to determine and facilitate the storing of data or information, such as storing the data using files or socket connections.

ID service 310 is employed to specify variables, such a class, a name of the class, etc. to assign identification to them. Once class, class names, etc. are assigned an ID (e.g., a number), they are then mapped with each other and with various components and variables via a mapping packet, instead of mapping by names. Using ID service 310, the same can be done with threads and methods. For example, by assigning IDs (instead of names) to threads and methods, when dumping is performed, the IDs of threads and methods are dumped rather than their names. This technique of using IDs (e.g., numbers) instead of using the names is efficient, fast, and saves memory.

For example, an allocation event is considered. ID numbers are mapped to various packet names, such as java.Hashtable is mapped to "2000", the thread (named, "main") is assigned "3", and the user (named, "Ralf") is assigned "7". Stack trace is then commenced using command lines, such as com.sap.test (line 30), com.sap.submethod (line 2003), etc. The even information may then be provided as 2000, 3, etc. It is known that ID number 2000 was mapped to the underlying hashtable, while ID number 3 was mapped to the thread. Using these ID's, names (e.g., main, Ralf, etc.) are not needed and instead, IDs are used, which provides an easier technique for packet name mapping. Similarly, object ID service 314 is used to assign IDs (e.g., numbers) to objects so the IDs can be used to, for example, identify and compare the objects, instead of using object names.

In one embodiment, profiling information and any other relevant data is displayed at a display device via GUI at a client so that a user can access and evaluate the displayed information. The information may also be stored at a database and/or file system for subsequent retrieval and analysis. Although JAVA components, such as J2EE server, JAVA VM, JAVA heap, and JAVA memory errors, etc., are discussed here for simplicity and brevity, it should be noted, however, that the underlying principles and embodiments of the present invention may be implemented within any type of object-oriented and runtime environments. Moreover, it should be noted that requirements and examples used in this document do not necessarily reflect the real values that a system or program would actually produce. For example, garbage collection may be invoked multiple times while checking the VM heap memory size, so that there are different VM implementations and, according to a relevant VM specification, a given VM implementation might not clean up the memory immediately after it has been requested to do so. Thus, to be sure that a memory cleanup is provoked, the memory size may be checked and the garbage collection may be invoked again, as necessary.

Garbage collection as described here includes a process designed to identify and reclaim blocks of memory that are dispensed by a memory allocator but are no longer "alive" or "live" (e.g., no longer being used, as determined, for example, by not being reachable from any currently referenced objects or entities). Garbage collection can sometimes be handled as a background task by runtime systems rather than as an explicit task by user programs. Garbage collection can also be handled as an inlined task. Garbage collection can be used to reclaim memory in runtime systems, and there are some well-known garbage collection algorithms (e.g., reference counting, mark-sweep, mark-compact, and copying algorithms).

A VM (e.g., VM 206) is an example of a runtime system. A VM refers to an abstract machine that includes an instruction set, a set of registers, a stack, a heap, and a method area, such as a machine or processor. A VM essentially acts as an interface between program code and the actual processor or hardware platform on which the program code is to be executed. The program code includes instructions from the VM instruction set that manipulates the resources of the VM. The VM executes instructions on the processor or hardware platform on which the VM is running, and manipulates the resources of that processor or hardware platform, so as to effect the instructions of the program code. For example, a JAVA source program can be compiled into program code, such as bytecode. Bytecode can be executed on a VM, such as JVM, running on any processor or platform. The JVM can either interpret the bytecode one instruction at a time, or the bytecode can be further compiled for the real processor or platform using a just-in-time (JIT) compiler.

The illustrated VM 206 includes a JVM (e.g., SAP JVM), which is used as an example; however, other examples of VMs, which can be used in various embodiments, include Advanced Business Application Programming (ABAP) language VMs, Common Language Runtime (CLR) VMs, and the like. ABAP is a programming language for developing applications for SAP systems, such as SAP R/3 system, which is a widely installed business application system developed by SAP AG of Walldorf, Germany. The CLR is a managed code execution environment developed by Microsoft Corp. of Redmond, Wash. For simplicity and brevity, the discussion in this document focuses on virtual machines, and in particular JAVA virtual machine 104, but it is to be understood that the techniques described herein can also be used with other types of runtime systems.

A runtime system includes a code execution environment that executes instructions or code in user requests and that provides runtime services for that code. Code runtime services may include functionality, such as process, thread, and memory management (e.g., laying out objects in the server memory, sharing objects, managing references to objects, and garbage collecting objects). Enhanced runtime services may include functionality, such as error handling and establishing security and connectivity.

The illustrated server 202 includes a J2EE server/engine/node, which supports Enterprise JAVA Bean ("EJB") components and EJB containers (at the business layer) and Servlets and JAVA Server Pages ("JSP") (at the presentation layer). It is understood that processes taught by the discussion above can be practiced within various software environments such as, for example, object-oriented and non-object-oriented programming environments, JAVA based environments (such as a J2EE environment or environments defined by other releases of the JAVA standard), other environments (e.g., a .NET environment, a Windows/NT environment each provided by Microsoft Corporation), and the like.

Figure 4:
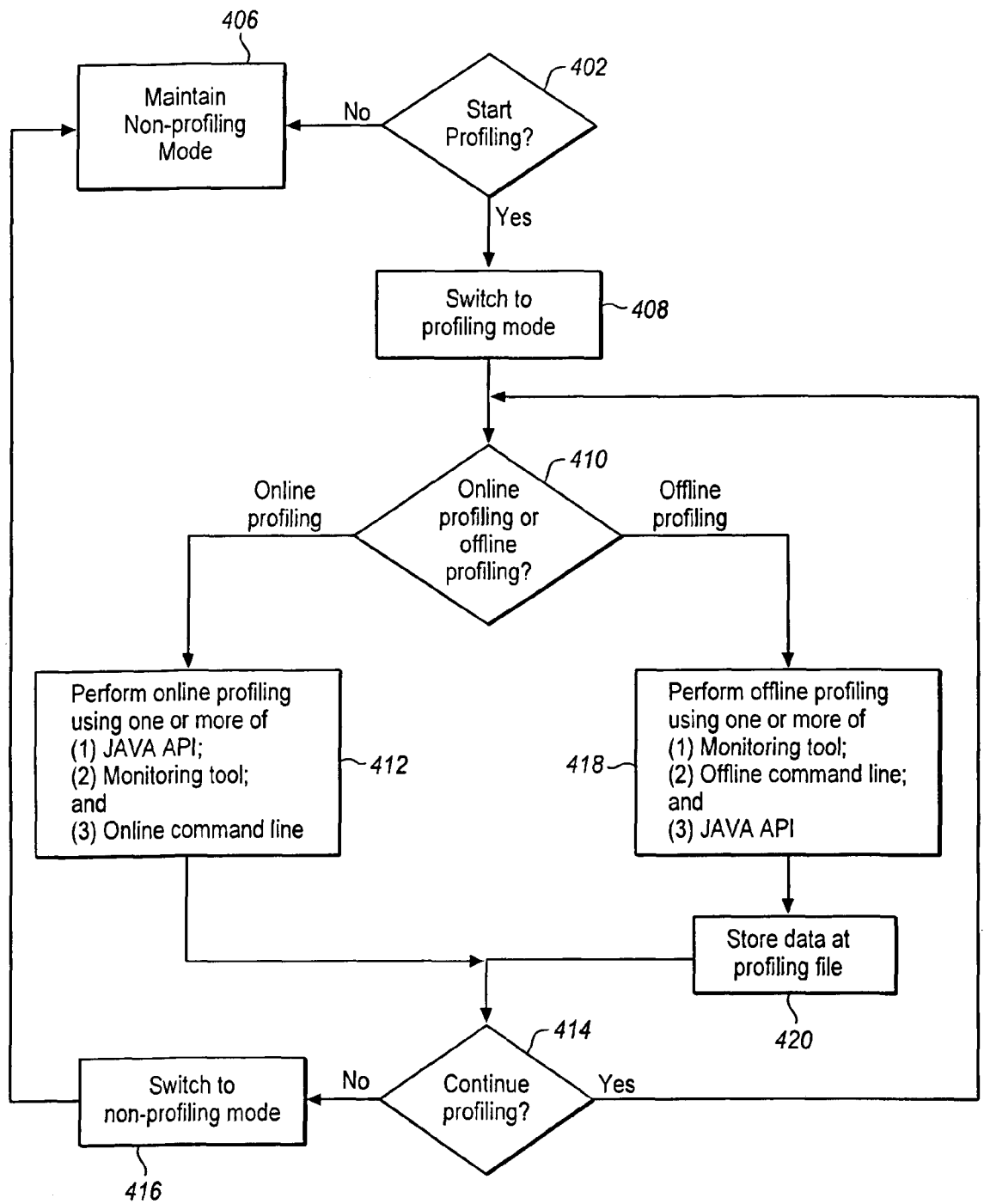
FIG. 4 illustrates an embodiment of a process for profiling using an embodiment of an on-demand profiling infrastructure.

FIG. 4 illustrates an embodiment of a process for profiling using an embodiment of an on-demand profiling infrastructure. At decision block 402, whether profiling need be started is determined. If not, the non-profiling mode is maintained, which saves system resources. If the profiling is to be started, the profiling mechanism is switched to the profiling mode at processing block 408. At decision block 410, a determination is made as to whether online or offline profiling is to be performed. If the profiling is to be performed online, the online profiling mode is triggered for, for example, interactive profiling at processing block 412.

Online profiling is started via JAVA APIs (e.g., server and client JAVA APIs), using monitoring tools (e.g., JAVA VM monitor), and/or using command lines. If the profiling is to be performed offline, the offline profiling mode is triggered for, for example, non-interactive profiling. Offline profiling can also be started using monitoring tools, using command lines, and/or via JAVA APIs as described above. At processing block 420, any profiling data obtained from offline profiling is stored at an external source, such as a profiling file. The data at the profiling file may be stored in zipped format. At decision block 414, whether the process of profiling be continued is determined. If yes, the profiling continues with decision block 410. If not, the profiling status is switched to the non-profiling mode at processing block 416. This non-profiling mode is maintained at processing block 406.

Figure 5:
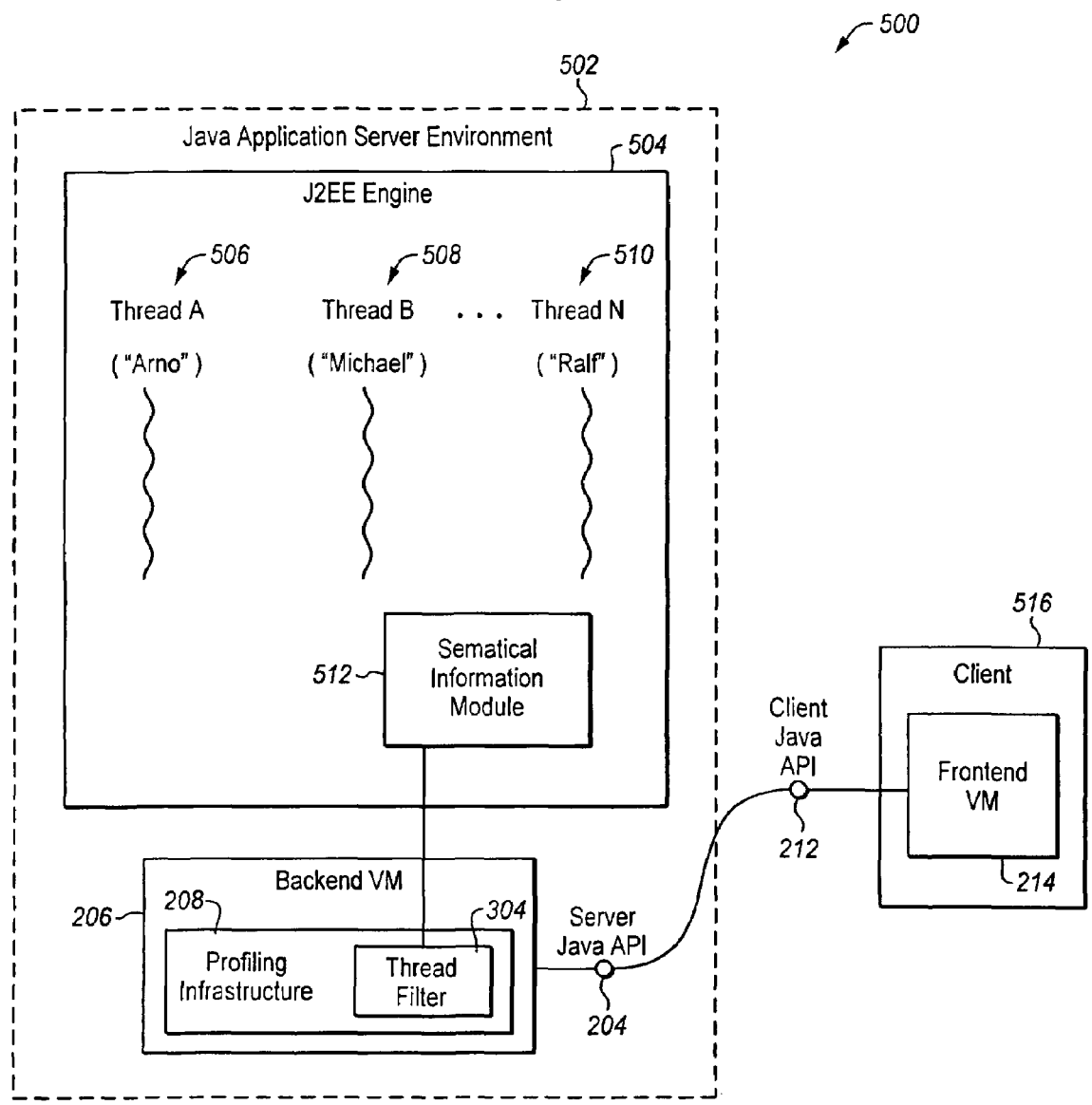
FIG. 5 illustrates an embodiment of a mechanism for customizing profiling sessions.

FIG. 5 illustrates an embodiment of a mechanism 500 for customizing profiling sessions. The illustrated embodiment includes a JAVA application server environment 502 ("server" or "server environment") that includes a J2EE engine 504 where prosecution of JAVA threads 506-510 occurs. Profiling infrastructure 208 at backend VM 206 provides an interface JAVA API) to annotate JAVA threads 506-510 using semantical information that is provided by semantical information module 512. The term "semantical information" refers, for example, to the name of the user currently running in a thread 506-510 (e.g., "Arno" at thread A 506, "Michael" at thread B 508, "Ralf" at thread N 510, etc.), the name of the application currently executing the user request in a thread 506-510, the name of the software component that is currently active in a thread 506-510, the identifier of the session that is currently active in a thread 506-510, the identifier of the request that is currently active in a thread 506-510, etc. It is contemplated that semantical information is not limited to these examples.

In one embodiment, semantical information may be provided at and by server environment 502 via semantical information module 512 residing at server 502. Backend VM 206 profiling infrastructure 208 which includes thread filter 304 that is in communication with the semantical information module 512 to allow the filtering of those entities that are specified for profiling allocations. For example, a particular user at a particular thread 408 (e.g., "Michael" at thread B 408) may be specified such that the profiling data for a profiling trace is only collected or not collected when the particular user "Michael" executes at the particular thread 408. Using this technique of mechanism 500, any negative impact of profiling sessions is limited to a particular area or entity. This is accomplished using semantical information (e.g., user name "Michael") associated with a particular thread 406-410 which is generated at server environment 502 and extracted and provided by semantical information module 512 and filtered using thread filter 304 at profiling infrastructure 208 at backend VM 206 in communication with frontend VM 214. Since the process of profiling is used and controlled by client 516, the user name (e.g., "Michael") (or any other entity, such as a session, an application, a request, etc.) associated with a particular thread 506-510 may be selected and identified by the user (e.g., developer, administrator, etc.) via client 516 via frontend VM 214. It is contemplated that the illustrated JAVA-based components, such as the server 502, the J2EE engine 504, the VMs 206, 214, etc. are provided as examples and that the mechanism 500 and other embodiments of the present invention can also be used with other non-JAVA-based environments and components. Furthermore, a backend VM 206 may reside at the same J2EE engine 504 as the semantical information module 512 or at another J2EE engine. Sever environment 502 and client 516 may include servers and clients similar to server 202 and client 216, respectively, of FIG. 2.

In one embodiment, mechanism 500 is used to associate profiling data with semantical information about various entities, such as users, sessions, requests, applications, and software components provided by server 502. Since none of the conventional mechanisms make use of semantical information, in one embodiment, using mechanism 500 having semantical information is used for profiling applications (e.g., JAVA applications) by assigning semantical information to profiling data, resulting reduced negative impact of profiling runs, particularly of the started profiling runs. For example, when a bunch of temporary JAVA objects are created during request processing, garbage collector is triggered frequently and a negative impact on request throughput is observed. Now, if a profiling trace is started for checking the allocation of the JAVA objects, the allocation events and the corresponding stack traces are obtained. This information allows the user to know where the actual allocations took place. In one embodiment, mechanism 500 allows for extracting semantical information from server 502 via semantical information module 512 to be used by profiling infrastructure 208 at backend VM 206 in communication with frontend VM 214 at client 516. The extracted semantical information is obtained at server 502 and contains information about the components and entities, such as the users, software component, sessions, etc., involved with the actual allocations. This semantical information provides semantical knowledge of profiling allocations that is used to reduce any negative impact of profiling runs relating to threads 506-510.

When profiling traces are started, the annotated thread information is related to the collected profiling data. For example, if a profiling trace for JAVA object allocations is started, the annotations associated with each thread 506-510 are written to a profiling output stream at start-up and upon each change. The object allocations are related to the thread 506-510 where the allocation actually occurs. This is information used to associate or assign the object allocations to various entities, such as users, sessions, applications, etc., as they relate to each thread 506-510. Furthermore, if a certain profiling is to be started, thread filter 304 is used to specify that the profiling data is to be collected if, for example, a particular user executes in a particular thread 506-510 (e.g., Arno at thread A 506) where the profiling event occurs. Using this technique, any negative impact of a started profiling session is limited to a particular entity, such as the particular user executing in the particular thread 506.

Figure 6:
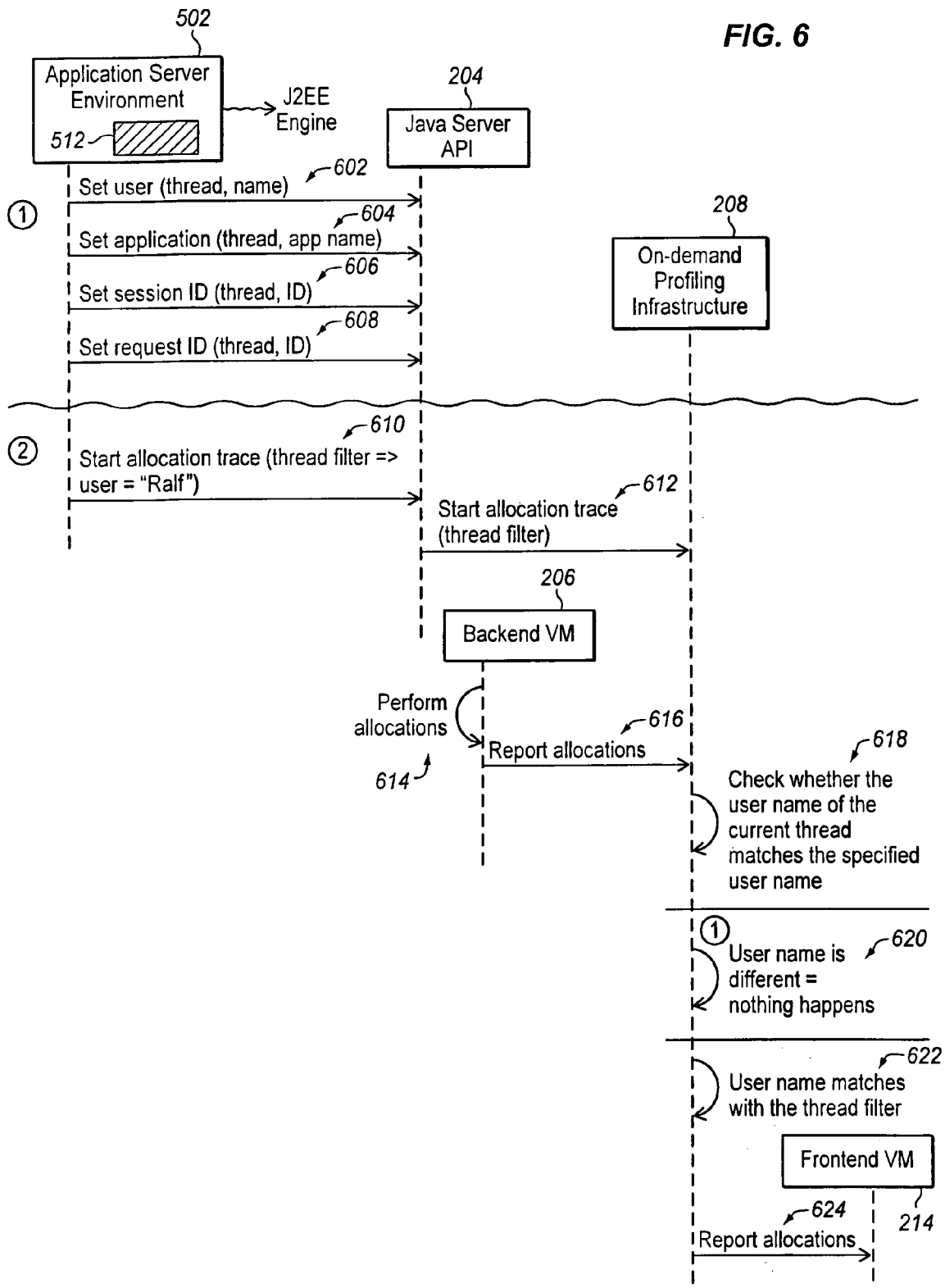
FIG. 6 illustrates an embodiment of a transaction sequence for customizing profiling sessions using semantical information.

FIG. 6 illustrates an embodiment of a transaction sequence for customizing profiling sessions using semantical information. In one embodiment, application server environment 502 includes semantical information module 512 to extract and collect semantical information from server 502 and expose the semantical information to a thread filter residing at on-demand profiling infrastructure 208 at backend VM 206. First, semantical information is associated with threads that are to be executed 602-608. For example, this semantical information includes setting or associating a user name to a thread 602, setting an application name to a thread 604, setting a session ID to a thread 606, setting a request ID to a thread 608, and the like. In one embodiment, at some point, the user identifies and chooses an entity (e.g., user name, application name, session name, request name, etc.) that corresponds to a particular thread that is being executed to limit the resulting profiling allocations to that particular entity or, in contrast, to remove that entity from being considered for the profiling allocations. The user may identify the entity via frontend VM 214 at a client.

Once the semantical information is identified (e.g., once the entity is identified, such as user name="Ralf"), this semantical information is communicated to profiling infrastructure 208 at backend VM 206 that is being profiled via server JAVA API 204, for example, prior to starting a profiling session. Once the semantical information is received at profiling infrastructure 208, the thread filter at profiling infrastructure 208 is used to filter other entities and information out such that the profiling data can be collected for this particular entity (e.g., user name="Ralf") that was specified when this particular entity executes in the thread where the profiling event occurs 610. This is so that a profiling trace (e.g., allocation trace) may start, but any impacts of the profiling session can be limited to a certain area (e.g., the specified entity). Here, allocation trace is merely used as an example and that this technique can be used with any number of profiling trace processes.

At profiling infrastructure, the allocation trace starts 612 using an allocation trace module along with the thread filter. Allocations are performed 614 at the backend VM 206 via the profiling infrastructure 208. Allocations are reported 616 to the profiling infrastructure 208. At profiling infrastructure 208, a determination is made as to whether the specified entity (in this case, user name="Ralf") is being executed at the current thread 618. In other words, whether the user name associated with the current thread matches the user name specified, "Ralf". If the specified entity is not found (e.g., the user name is different from the specified user name), the process ends and no allocation information is reported 620. If, however, the entity being executed at the current thread matches with the entity specified and then filtered by the thread filter 622 (e.g., the user name is "Ralf"), the allocations, having detected and collected allocations or allocation information, are reported 624 to frontend 214 to be displayed for the user via a display device at the client. The reported allocation information relates to the semantical information (e.g., the identified entity) which provides a narrow set of information, resulting in limiting any negative impact of the profiling session to a particular area as identified by the semantical information.

Figure 7:
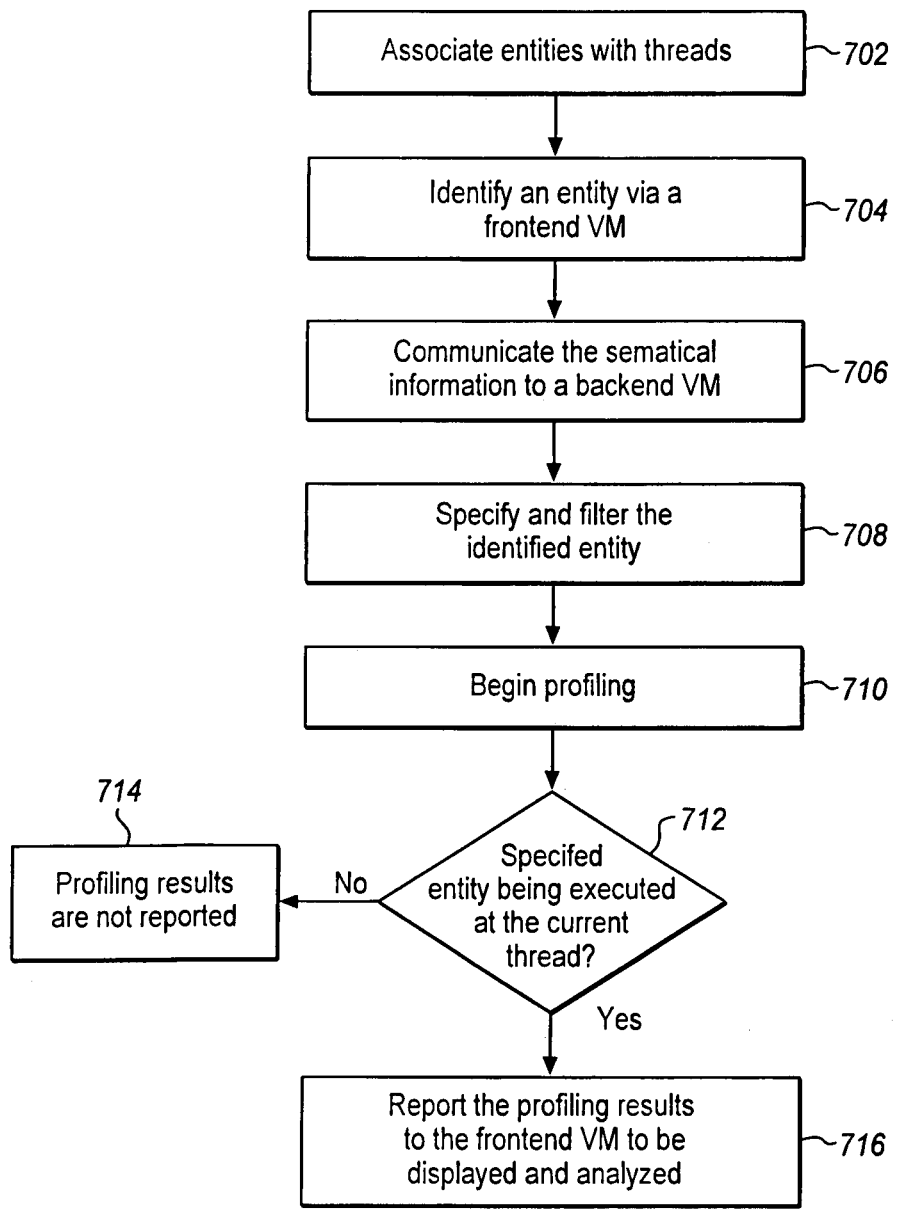
FIG. 7 illustrates an embodiment of a process for customizing profiling session semantical information.

FIG. 7 illustrates an embodiment of a process for customizing profiling sessions using semantical information. At processing block 702, various entities are associated with threads. At processing block 704, an entity is identified by the user via a frontend VM at a client. One or more entities are identified so that any profiling information resulting from the profiling session and the profiling information that is reported to the frontend VM is limited to the one or more specified entities. In contrast, one or more entities may be identified so that the profiling information for the one or more specified entities may be excluded from being reported to the frontend VM. Once the entity is specified, this semantical information is communicated to on-demand profiling infrastructure at a backend VM at processing block 706. Using the semantical information including the specified entity, the specified entity is identified and filtered by a thread filter at the profiling infrastructure at profiling block 708 so the profiling session can begin. At processing block 710, the profiling session (e.g., allocation trace) begins.

At decision block 712, a determination is made as to whether the specified entity is being executed at the current thread. If the entity does not match, the profiling session continues or ends, but the profiling results are not reported to the frontend VM at processing block 714. At processing block 716, if the entity matches the specified entity, the profiling session continues and the results of the profiling session are reported to the frontend VM so they can be displayed to the user via a display device at the client.

Figure 8:
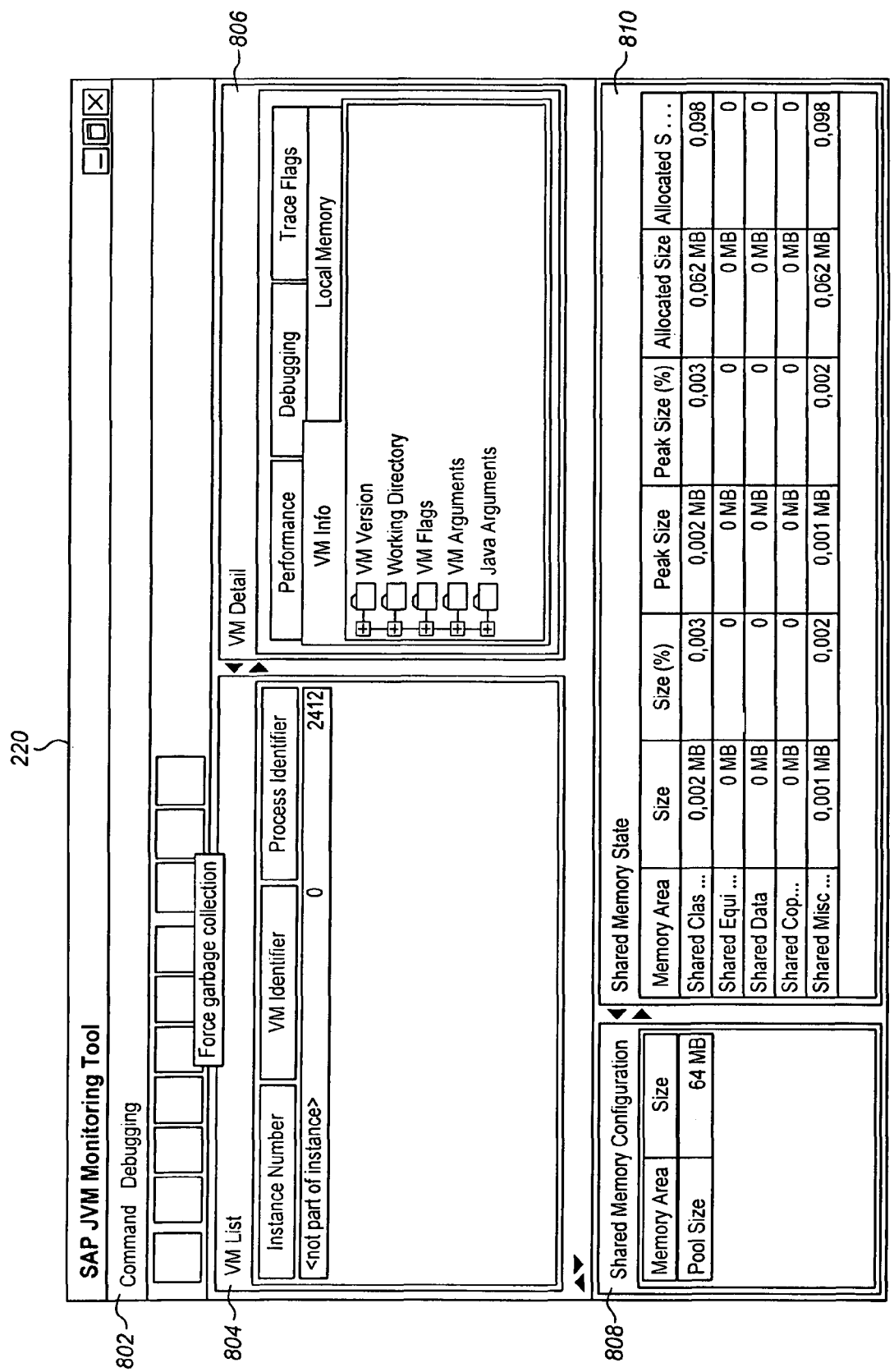
FIG. 8 illustrates an embodiment of a monitoring tool.

FIG. 8 illustrates an embodiment of a monitoring tool 220. The illustrated monitoring tool 220 includes a JVM monitoring tool (e.g., SAP JVM monitoring tool). Monitoring tool 220 includes a menu line 802 that includes various menu items, such as command, debugging, etc. Monitoring tool 220 further provides a list of VMs 804, and details about any VM 806 which includes a number of items, such as performance, VM info, debugging, trace flags, local memory, etc. Monitoring tool 220 further provides shared memory configuration 808 and shared memory state 810. Monitoring tool 220 is illustrated merely as an example and the embodiment of the present invention are in no way limited to using the illustrated monitoring tool 220.

Processes taught by the discussion above may be performed with program code, such as machine-executable instructions, which can cause a machine (such as a "virtual machine", a general-purpose processor disposed on a semiconductor chip, a special-purpose processor disposed on a semiconductor chip, etc.) to perform certain functions. Alternatively, these functions may be performed by specific hardware components that contain hardwired logic for performing the functions, or by any combination of programmed computer components and custom hardware components.

One or more modules, components, or elements described throughout this document, such as the ones shown within or associated with the on-demand profiling infrastructure 206 of profiling mechanism 200 of FIG. 2, may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above. The code may also be downloaded from a remote computer (e.g., a server) to a requesting computer (e.g., a client) by way of data signals embodied in a propagation medium (e.g., via a communication link (e.g., a network connection)).

Figure 9:
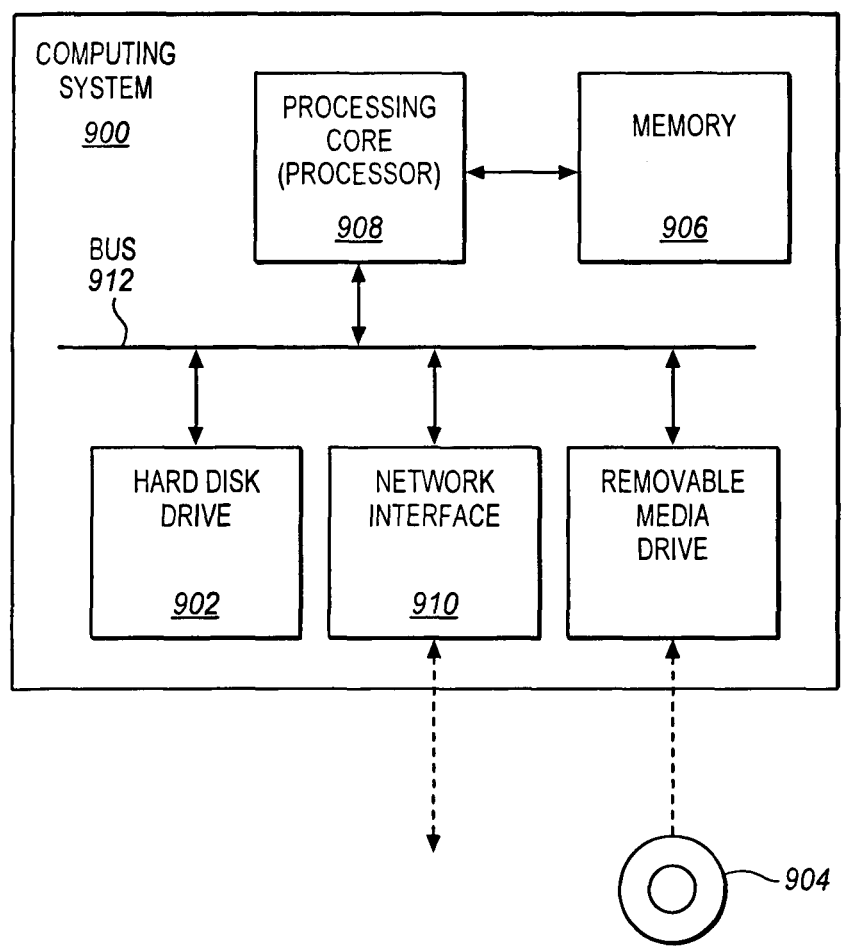
FIG. 9 illustrates an embodiment of a computing system.

FIG. 9 illustrates an embodiment of a computing system 900. Computing system 900 may be used for implementing one or more embodiments of the present invention and for executing program code stored by an article of manufacture. It is important to recognize that the computing system 900 represents merely of various computing system architectures that can be used for the same purposes. The applicable article of manufacture may include one or more fixed components (such as hard disk drive 902 or memory 906) and/or various movable components, such as compact disk (CD) ROM 904, a compact disc, a magnetic tape, and the like. To execute the program code, typically instructions of the program code are loaded into RAM 906. Then, processing core 908 executes the instructions. A processing core may include one or more processors and a memory controller function. A virtual machine or "interpreter" (e.g., JVM) may run on top of the processing core (architecturally speaking) to convert abstract code (e.g., JAVA bytecode) into instructions that are understandable to the specific processor(s) of processing core 908. Computing system 900 further includes network interface 910 and bus 912 to connect to other systems via a network and to have various components communicate with each other, respectively.

Figure 10:
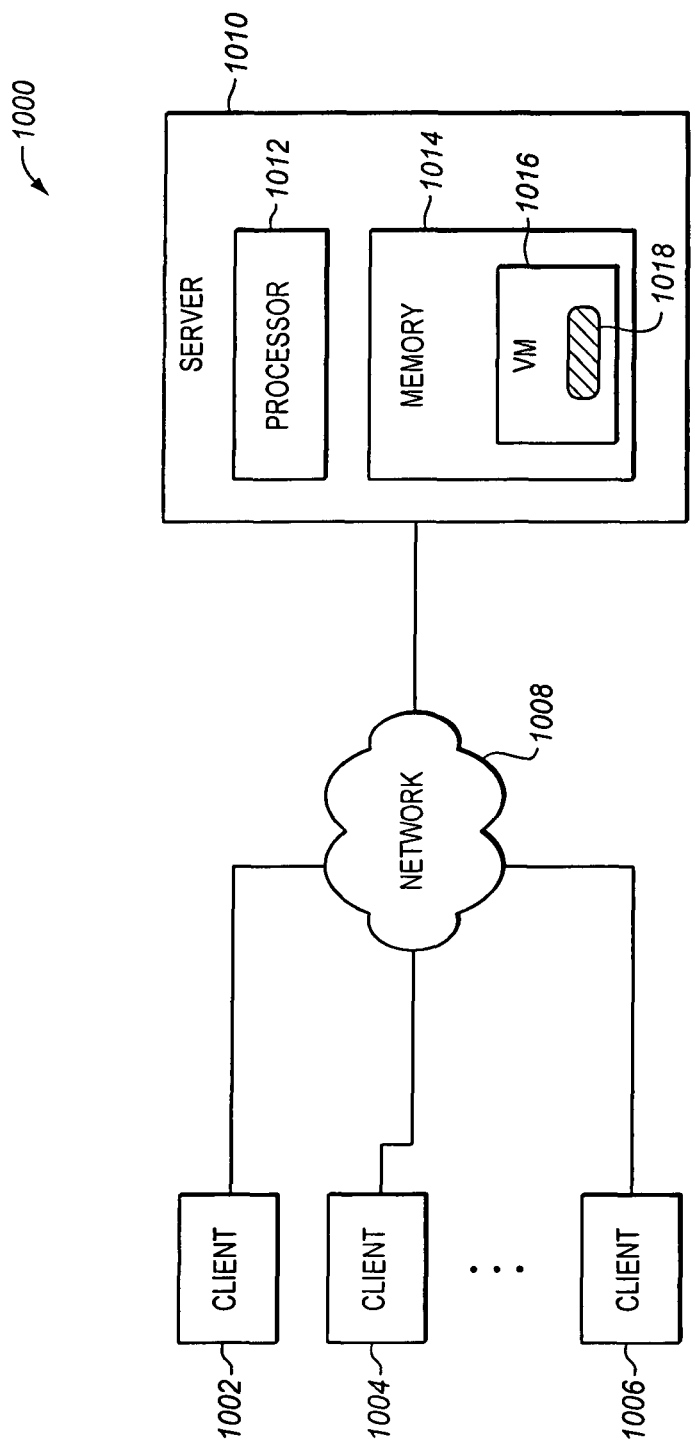
FIG. 10 illustrates an embodiment of a client/server network system employing a message enhancement mechanism.

FIG. 10 illustrates an embodiment of a client/server network system 1000 employing an on-demand profiling infrastructure 1018. As illustrated, network 1008 links server 1010 with client systems 1002-1006. Server 1010 includes programming data processing system suitable for implementing apparatus, programs, and/or methods in accordance with one or more embodiments of the present invention. Server 1010 includes processor 1012 and memory 1014. Server 1010 provides a core operating environment for one or more runtime systems (e.g., VM 1016) at memory 1014 to process user requests. Memory 1014 may include a shared memory area that is accessible by multiple operating system processes executing in server 1010. For example, VM 1016 may include an enterprise server (e.g., a J2EE-compatible server or node, Web Application Server developed by SAP AG, WebSphere Application Server developed by IBM Corp. of Armonk, N.Y., and the like). The enterprise server at VM 1016 may host the on-demand profiling infrastructure 1018. Memory 1014 can be used to store an operating system, a Transmission Control Protocol/Internet Protocol (TCP/IP) stack for communicating over network 1008, and machine executable instructions executed by processor 1012. In some embodiments, server 1010 may include multiple processors, each of which can be used to execute machine executable instructions.

Client systems 1002-1006 may execute multiple application or application interfaces. Each instance or application or application interface may constitute a user session. Each user session may generate one or more requests to be processed by server 1010. The requests may include instructions or code to be executed on a runtime system, such as VM 1016, on server 1010, such as the requests made via the on-demand profiling infrastructure 1018 and its components and modules as described throughout this document.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
    receiving, at a first virtual machine from a second virtual machine, a request for a customized profiling session for one or more profiling entities of a plurality of entities associated with a thread associated with a software application at a computing system;
    separating, at the first virtual machine, one or more profiling entities from the rest of the plurality of entities based on semantical information corresponding to the thread, wherein the semantical information provides classification of each entity of the plurality of entities associated with the thread; and
    initiating and running, on-demand, the customized profiling session at the first virtual machine for the one or more profiling entities associated with the thread based on the semantical information corresponding to the thread, wherein the on-demand initiating and running are performed independent of default profiling agents or default debugging agents and in runtime without having to stop or restart the first virtual machine or an application server hosting the first virtual machine; and
    communicating, from the first virtual machine to the second virtual machine, resulting profiling information obtained from running of the customized profiling session.

2. The method of claim 1, wherein the plurality of profiling entities comprises one or more of a user, the software application, a software component, a session, and a request associated with the thread, wherein the request includes a user request or a virtual machine request relating to the software application.

3. The method of claim 1, wherein the semantical information comprises one or more of a user name of the user of the software application at the computing system, an application name of the software application running in response to a user request of the user, a software component name of the software component within the software application, a session identifier of the session active in the thread, a user request identifier of the user request that initiated or amended running of the software application, a virtual machine request identifier of the virtual machine request that is currently active in the thread.

4. The method of claim 1, further comprising receiving the semantical information from an application server environment associated with the computing system, the application server environment including a JAVA 2 Enterprise Edition (J2EE) engine or an Advanced Business Application Programming (ABAP) engine, wherein the first and second virtual machines include one or more of JAVA virtual machines, ABAP virtual machines, and Common Language Runtime (CLR) virtual machines.

5. The method of claim 1, further comprising displaying the profiling information via a display device coupled to the computing system.

6. The method of claim 1, wherein the default profiling agents comprise JAVA profiling tools including one or more of a JAVA profiling agent, a JAVA Virtual Machine Profiling Interface (JVMPI), and a JAVA Virtual Machine Tool Interface (JVMTI).

7. The method of claim 1, wherein the default debugging agents include a JAVA Debug Wire Protocol (JDWP).

8. A system comprising:
a computing system having a memory to store instructions for facilitating customized profiling, and a processing device to execute the instructions, wherein the instructions cause the processing device to:
receive, at a first virtual machine from a second virtual machine, a request for a customized profiling session for one or more profiling entities of a plurality of entities associated with a thread associated with a software application at the computing system;
separate, at the first virtual machine, one or more profiling entities from the rest of the plurality of entities based on semantical information corresponding to the thread, wherein the semantical information provides classification of each entity of the plurality of entities associated with the thread; and
initiate and run, on-demand, the customized profiling session at the first virtual machine for the one or more profiling entities associated with the thread based on the semantical information corresponding to the thread, wherein the on-demand initiating and running are performed independent of default profiling agents or default debugging agents and in runtime without having to stop or restart the first virtual machine or an application server hosting the first virtual machine; and
communicate, from the first virtual machine to the second virtual machine, resulting profiling information obtained from running of the customized profiling session.

9. The system of claim 8, wherein the plurality of profiling entities comprises one or more of a user, the software application, a software component, a session, and a request associated with the thread, wherein the request includes a user request or a virtual machine request relating to the software application.

10. The system of claim 9, wherein the semantical information comprises one or more of a user name of the user of the software application at the computing system, an application name of the software application running in response to a user request of the user, a software component name of the software component within the software application, a session identifier of the session active in the thread, a user request identifier of the user request that initiated or amended running of the software application, a virtual machine request identifier of the virtual machine request that is currently active in the thread.

11. The system of claim 8, further comprising receiving the semantical information from an application server environment associated with the computing system, the application server environment including a JAVA 2 Enterprise Edition (J2EE) engine or an Advanced Business Application Programming (ABAP) engine, wherein the first and second virtual machines include one or more of JAVA virtual machines, ABAP virtual machines, and Common Language Runtime (CLR) virtual machines.

12. The system of claim 8, further comprising displaying the profiling information via a display device coupled to the computing system.

13. The system of claim 8, wherein the default profiling agents comprise JAVA profiling tools including one or more of a JAVA profiling agent, a JAVA Virtual Machine Profiling Interface (JVMPI), and a JAVA Virtual Machine Tool Interface (JVMTI).

14. The system of claim 8, wherein the default debugging agents include a JAVA Debug Wire Protocol (JDWP).

15. A non-transitory machine-readable medium including instructions that, when executed by a machine, cause the machine to:
receive, at a first virtual machine from a second virtual machine, a request for a customized profiling session for one or more profiling entities of a plurality of entities associated with a thread associated with a software application at a computing system;
separate, at the first virtual machine, one or more profiling entities from the rest of the plurality of entities based on semantical information corresponding to the thread, wherein the semantical information provides classification of each entity of the plurality of entities associated with the thread; and
initiate and run, on-demand, the customized profiling session at the first virtual machine for the one or more profiling entities associated with the thread based on the semantical information corresponding to the thread, wherein the on-demand initiating and running are performed independent of default profiling agents or default debugging agents and in runtime without having to stop or restart the first virtual machine or an application server hosting the first virtual machine; and
communicate, from the first virtual machine to the second virtual machine, resulting profiling information obtained from running of the customized profiling session.

16. The non-transitory machine-readable medium of claim 15, wherein the plurality of profiling entities comprises one or more of a user, the software application, a software component, a session, and a request associated with the thread, wherein the request includes a user request or a virtual machine request relating to the software application.

17. The non-transitory machine-readable medium of claim 16, wherein the semantical information comprises one or more of a user name of the user of the software application at the computing system, an application name of the software application running in response to a user request of the user, a software component name of the software component within the software application, a session identifier of the session active in the thread, a user request identifier of the user request that initiated or amended running of the software application, a virtual machine request identifier of the virtual machine request that is currently active in the thread.

18. The non-transitory machine-readable medium of claim 15, further comprising receiving the semantical information from an application server environment associated with the computing system, the application server environment including a JAVA 2 Enterprise Edition (J2EE) engine or an Advanced Business Application Programming (ABAP) engine, wherein the first and second virtual machines include one or more of JAVA virtual machines, ABAP virtual machines, and Common Language Runtime (CLR) virtual machines.

19. The non-transitory machine-readable medium of claim 15, further comprising displaying the profiling information via a display device coupled to the computing system.

20. The non-transitory machine-readable medium of claim 15, wherein the default profiling agents comprise JAVA profiling tools including one or more of a JAVA profiling agent, a JAVA Virtual Machine Profiling Interface (JVMPI), and a JAVA Virtual Machine Tool Interface (JVMTI).

21. The non-transitory machine-readable medium of claim 15, wherein the default debugging agents include a JAVA Debug Wire Protocol (JDWP).

* * * * *